US012640290B2

(12) United States Patent
Lider et al.

(10) Patent No.: US 12,640,290 B2
(45) Date of Patent: May 26, 2026

(54) HIGH-VOLTAGE BUSHING WITH FASTENING FLANGE

(71) Applicant: Siemens Energy Global GmbH & Co. KG, Munich (DE)

(72) Inventors: Paul Lider, Siegburg (DE); Tim Schnitzler, Kreuzau (DE)

(73) Assignee: HSP Hochspannunsgeräte GmbH, Troisdorf (DE)

( * ) Notice: Subject to any disclaimer, the term of this patent is extended or adjusted under 35 U.S.C. 154(b) by 157 days.

(21) Appl. No.: 18/570,199

(22) PCT Filed: Jun. 17, 2021

(86) PCT No.: PCT/EP2021/066371
§ 371 (c)(1),
(2) Date: Dec. 14, 2023

(87) PCT Pub. No.: WO2022/262976
PCT Pub. Date: Dec. 22, 2022

(65) Prior Publication Data
US 2024/0274330 A1     Aug. 15, 2024

(51) Int. Cl.
*H01B 17/58* (2006.01)
*H02G 15/064* (2006.01)

(52) U.S. Cl.
CPC ......... *H01B 17/583* (2013.01); *H02G 15/064* (2013.01)

(58) Field of Classification Search
None
See application file for complete search history.

(56) References Cited

U.S. PATENT DOCUMENTS

| | | | | |
|---|---|---|---|---|
| 2,282,255 A | * | 5/1942 | Skvortzoff | H01B 17/26 174/31 R |
| 3,141,061 A | * | 7/1964 | Bianco | H01B 17/306 174/75 R |
| 3,197,551 A | * | 7/1965 | Linderholm | H01B 17/005 174/73.1 |
| 3,300,570 A | * | 1/1967 | Spiece | H02G 7/20 174/45 R |
| 3,421,130 A | * | 1/1969 | Leonard | H01H 9/10 337/148 |

(Continued)

FOREIGN PATENT DOCUMENTS

| | | |
|---|---|---|
| CN | 201638621 U | 11/2010 |
| CN | 102623110 A | 8/2012 |

(Continued)

*Primary Examiner* — Timothy J. Dole
*Assistant Examiner* — Muhammed Azam
(74) *Attorney, Agent, or Firm* — Laurence A. Greenberg; Werner H. Stemer; Ralph E. Locher

(57) ABSTRACT

A high-voltage bushing includes an insulation member, an inner conductor that extends through the insulation member, and a fastening flange that is arranged externally on the insulation member. The high-voltage bushing additionally includes a retaining ring that is connected to the fastening flange, and the insulation member includes an outer projection that is arranged on the outer circumference and interlockingly cooperates with an inner projection on the retaining ring to counteract an axial force on the fastened high-voltage bushing.

10 Claims, 2 Drawing Sheets

(56) References Cited

U.S. PATENT DOCUMENTS

| | | | | |
|---|---|---|---|---|
| 3,610,813 | A * | 10/1971 | Linderholm | ........... H02G 15/22 174/77 R |
| 4,454,381 | A * | 6/1984 | Ito | .......................... H02G 3/088 174/650 |
| 6,515,232 | B2 * | 2/2003 | Forster | ................. H01B 17/265 174/31 R |
| 8,597,040 | B2 * | 12/2013 | Siebens | .................. H01R 13/53 439/301 |
| 8,969,729 | B2 * | 3/2015 | Jahnel | .................... H01B 17/26 174/650 |
| 9,741,475 | B2 * | 8/2017 | Elder | ................... H01B 17/265 |
| 10,283,242 | B2 * | 5/2019 | Sumimoto | ........... H02G 15/064 |
| 11,270,817 | B2 | 3/2022 | Sjöberg et al. | |
| 11,289,243 | B2 * | 3/2022 | Langens | ............... H01B 17/28 |
| 11,377,047 | B2 * | 7/2022 | Tasaka | ................ B60R 16/0207 |
| 11,469,014 | B2 * | 10/2022 | Engels | ................. H01B 17/583 |
| 11,923,107 | B2 * | 3/2024 | Langens | ............... H01B 17/36 |
| 2009/0288878 | A1 | 11/2009 | Rocks et al. | |
| 2010/0018002 | A1 | 1/2010 | Bresney et al. | |
| 2012/0292073 | A1 * | 11/2012 | Engels | ................... H01B 17/28 174/73.1 |
| 2013/0233617 | A1 * | 9/2013 | Engels | ..................... H01R 3/00 174/74 A |
| 2024/0274330 | A1 * | 8/2024 | Lider | .................. H01B 17/583 |

FOREIGN PATENT DOCUMENTS

| | | | | |
|---|---|---|---|---|
| EP | 1284484 | A1 | 2/2003 | |
| EP | 3544028 | A1 | 9/2019 | |
| EP | 3699934 | A1 * | 8/2020 | .............. H02G 3/22 |
| WO | WO 2016048742 | A1 | 3/2016 | |
| WO | WO 2020043731 | A1 | 3/2020 | |

* cited by examiner

HIGH-VOLTAGE BUSHING WITH FASTENING FLANGE

FIELD AND BACKGROUND OF THE INVENTION

The invention relates to a high-voltage bushing comprising an insulation member, an inner conductor which passes through the insulation member, and a fixing flange arranged externally on the insulation member.

The usual purpose of such a high-voltage bushing is to electrically insulate the inner conductor, which is at a high-voltage potential when the high-voltage bushing is in service, from an environment, for example a wall of a high-voltage installation or a casing wall of a transformer, which is at earth potential. Furthermore, high-voltage bushings are also used as cable termination boxes for connecting a cable to an overhead line.

When in service, the high-voltage bushing is in most cases fixedly fastened by means of the fixing flange to the wall or to another component which is correspondingly arranged in a static manner. The two axial ends of the inner conductor of the high-voltage bushing are accordingly connected to electrical lines (e.g. an overhead line, a transformer winding or a cable).

In this context, it is important for the operability and reliability of the high-voltage bushing in particular that there is a suitable mechanical connection with the connected line and that the transition between the two lines connected together by means of the high-voltage bushing is coordinated electrically and in respect of the field.

SUMMARY OF THE INVENTION

The object of the invention is to provide a high-voltage bushing of the type in question which is as reliable as possible in service.

The object is achieved according to the invention in the case of a high-voltage bushing of the type in question in that the high-voltage bushing further comprises a retaining ring which is connected to the fastening flange, in a suitable manner detachably, for example by means of a screw connection, and the insulation member has on the outer circumference an outer projection which cooperates by interlocking engagement with an inner projection of the retaining ring in order to counteract an axial force on the high-voltage bushing when it is fixed in service. High compressive and tensile forces can act on the high-voltage bushing when the high-voltage bushing is in service. These forces can in part be absorbed by a frictional engagement between the individual components of the high-voltage bushing, for example between the insulation member and the fixing flange, wherein the fixing flange can be connected directly by means of frictional engagement to the insulation member or to an external composite insulator in which the insulation member is arranged. In some applications, however, forces of up to 100 kN can act on the high-voltage bushing, which can lead to the insulation member slipping relative to the fixing flange, and even to the insulation member slipping out of the composite insulator in a particularly undesirable case.

The outer projection of the insulation member cooperates with the inner projection of the ring and advantageously provides a retaining force which counteracts an axial tensile or compressive force and prevents the insulation member from being displaced relative to the fixing flange, or at least minimizes the risk of such displacement. For most applications, it is sufficient if a radial height of the outer projection is between 3 mm and 30 mm.

Expediently, the outer projection cooperates with the inner projection at an interlocking engagement surface or support surface, interlocking engagement surface is inclined relative to a longitudinal axis of the high-voltage bushing by less than 90 degrees. Accordingly, the outer projection does not have a typical step shape but is in the form of a chamfer. An inclined form of the support surface is particularly advantageous, because it results in an introduction of force into the components that does not at the same time generate a rupture initiation point, as could be the case with a right angle, for example.

According to one embodiment of the invention, the retaining ring is of multi-part, in particular two-part, form. It can be advantageous in some applications if the retaining ring does not have to be pushed onto the insulation member but can be assembled from the two or more parts. In particular when the geometry of the high-voltage bushing, or of the insulation member, does not allow the retaining ring to be pushed on, mounting can be achieved by assembly of the two-part retaining ring.

Preferably, an O-ring seal, preferably made of a resilient material, is arranged between the outer projection and the inner projection. The O-ring seal serves to compensate for any structural inaccuracies of the two projections. The O-ring seal can consist, for example, of nitrile rubber or of a resilient rubber material.

It can be advantageous in some applications if the insulation member has a counter-projection at a conically tapering end. The counter-projection can advantageously allow the geometry of the insulation member, in particular a cone angle of the tapering end, to be adapted to a geometry of a connection component, or the dielectric properties of the high-voltage bushing to be optimized in that region.

In order to adapt the inner conductor to a connection line, the high-voltage bushing can comprise a sleeve. The sleeve has been pushed with an accurate fit onto a prepared seat of the winding support. It has substantially no current-conducting function. The more precisely the high-voltage bushing is adapted at its axial end to a connection part for connection to an electrical line, the better the frictional engagement between those two elements can be configured, as a result of which tensile forces can better be withstood in some applications. In addition, good dielectric properties can be ensured at the connection point between the high-voltage bushing and the respective connection component.

According to one embodiment of the invention, the insulation member comprises resin-impregnated insulation plies. Such an insulation member is dimensionally stable after impregnation with the resin (e.g. an epoxy resin) and forms a relatively hard block, which is particularly suitable for shaping of the outer projection. The insulation plies can comprise paper or nonwoven and can be wound concentrically or helically around the inner conductor to form a wound body. In this way, the high-voltage bushing can be produced particularly simply and inexpensively. Moreover, a particularly uniform arrangement of the insulation plies in the insulation member can be ensured.

Preferably, the insulation body comprises a control region with conducting control inlays for field control. An axial extent of the control region is determined by the axial extent of the control inlays. The control inlays serve for the capacitive field control of the electric field of the high-voltage bushing when it is in service. A further improvement in the electrical properties of the high-voltage bushing is thus obtained. The control inlays are arranged substantially concentrically with one another around the inner conductor. They can be produced, for example, in the form of foils from aluminum. The outer projection is in a suitable manner situated outside the control region of the insulation member.

With regard to a further improvement in the dielectric properties of the high-voltage bushing, the insulation member comprises an electrode which is electrically (galvanically) connected to the inner conductor and which is arranged outside an axial extent of the control region. The electrode is in a suitable manner a separate metallic inlay (e.g. of aluminum). The inlay is arranged preferably substantially concentrically with the inner conductor, for example at a radial distance of between 5 mm and 20 mm from an outer circumference of the inner conductor. It can have an axial length of between 10 mm and 50 mm. The connection to the inner conductor, whereby the electrode can at the same time be connected to a first control inlay, , is expediently implemented by means of a metallic strip (e.g. of copper). By the use of the electrode, it is possible to achieve stress in respect of field strength that is as low as possible, wherein this can also lead to a size of the high-voltage bushing that is as reduced as possible, as a result of which the mechanical stresses in respect of the compressive or tensile forces can also be reduced.

A particularly suitable application of the high-voltage bushing is obtained in the case of a cable termination box, wherein the high-voltage bushing is connected on a conductor side or at a conductor end to an electrical conductor, in particular a conductor of an overhead line, and on a cable side or at a cable end to a cable connector. The advantages arise here in particular as a result of the measures described hereinbefore relating to the design in respect of the field and a coordination of the profile of the field lines starting from the inlay ends and the electrode in the active part, or the insulation member, of the high-voltage bushing across to the field-controlling elements in the cable end. Further advantages result from the above-described measures which make it possible to minimize the risk of the line unintentionally being pulled out of the high-voltage bushing owing to the occurrence of high tensile forces.

The invention will be explained further hereinbelow with reference to FIGS. 1 and 2.

DETAILED DESCRIPTION OF THE INVENTION

Figure 1:
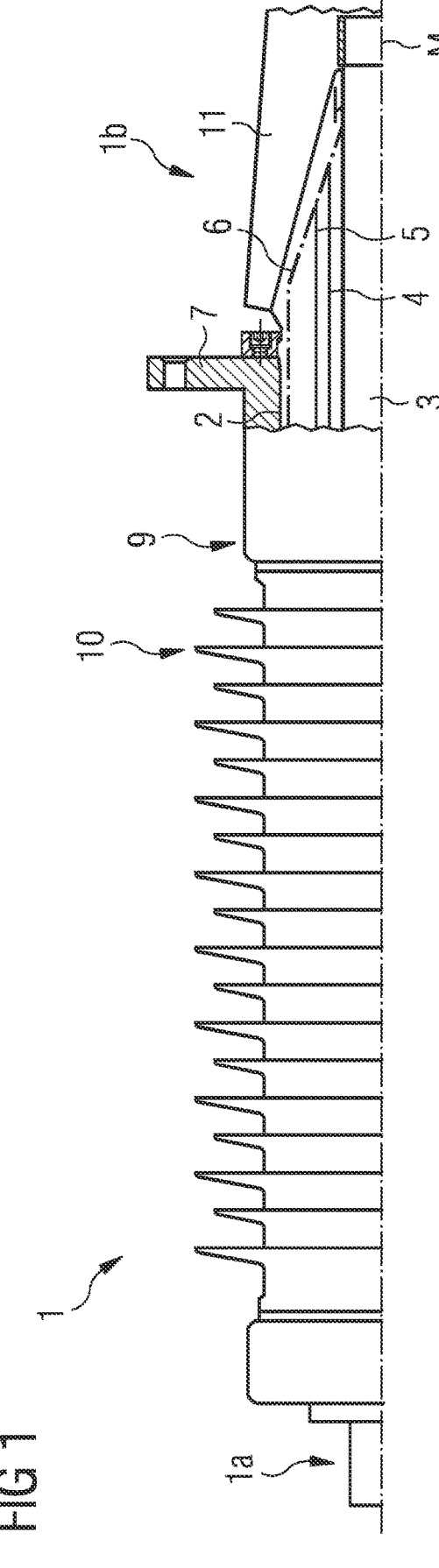
FIG. 1 shows an exemplary embodiment of a high-voltage bushing according to the invention in a schematic representation.

FIG. 1 shows a high-voltage bushing. The high-voltage bushing 1 comprises an insulation member 2 and an inner conductor 3 which passes through the insulation member 2. In the example shown, the high-voltage bushing 1 has a free conductor end 1a for connection to an overhead line, and a cable end 1b for connection to a cable connector or by means of the cable connector to a cable. A dot-and-dash line M marks a center axis or axis of symmetry of the high-voltage bushing 1.

The insulation member 2 has insulation plies of paper, nonwoven or another insulating material, which are wound on the inner conductor 3. Alternatively, the insulation plies can also be wound on a winding support in which an inner conductor is arranged. Within the insulation member 2 there are, at radial distances from one another, conducting control inlays 4, 5 (e.g. of aluminum foils) which serve to control the electric field. For reasons of clarity, only two of the control inlays are represented graphically in FIG. 1, but the number of control inlays can be higher according to the application. The spatial region in which the control inlays 4, 5 extend within the insulation member 2 is indicated in FIG. 1 by means of a dot-and-dash line 6. The insulation member 2 is impregnated with an epoxy resin and forms a compact block. The insulation member 2 tapers conically to the cable end 1b. For better connection to the cable connector, an insulation layer 11 comprising a resilient material (e.g. silicone, rubber, etc.) can be arranged at the cable end 1b.

The high-voltage bushing 1 further comprises a fixing flange 7, in the example shown in the form of a flange plate, which is arranged externally, directly on the insulation member 2. By means of the fixing flange 7, the high-voltage bushing 1 is optionally fixed to a frame (which preferably comprises insulator legs). When in service, the high-voltage bushing 1 of FIG. 1 is accordingly positioned vertically, wherein the cable end 1b is at the bottom. The high-voltage bushing 1 further has an outer housing 9 with insulator sheds 10.

Figure 2:
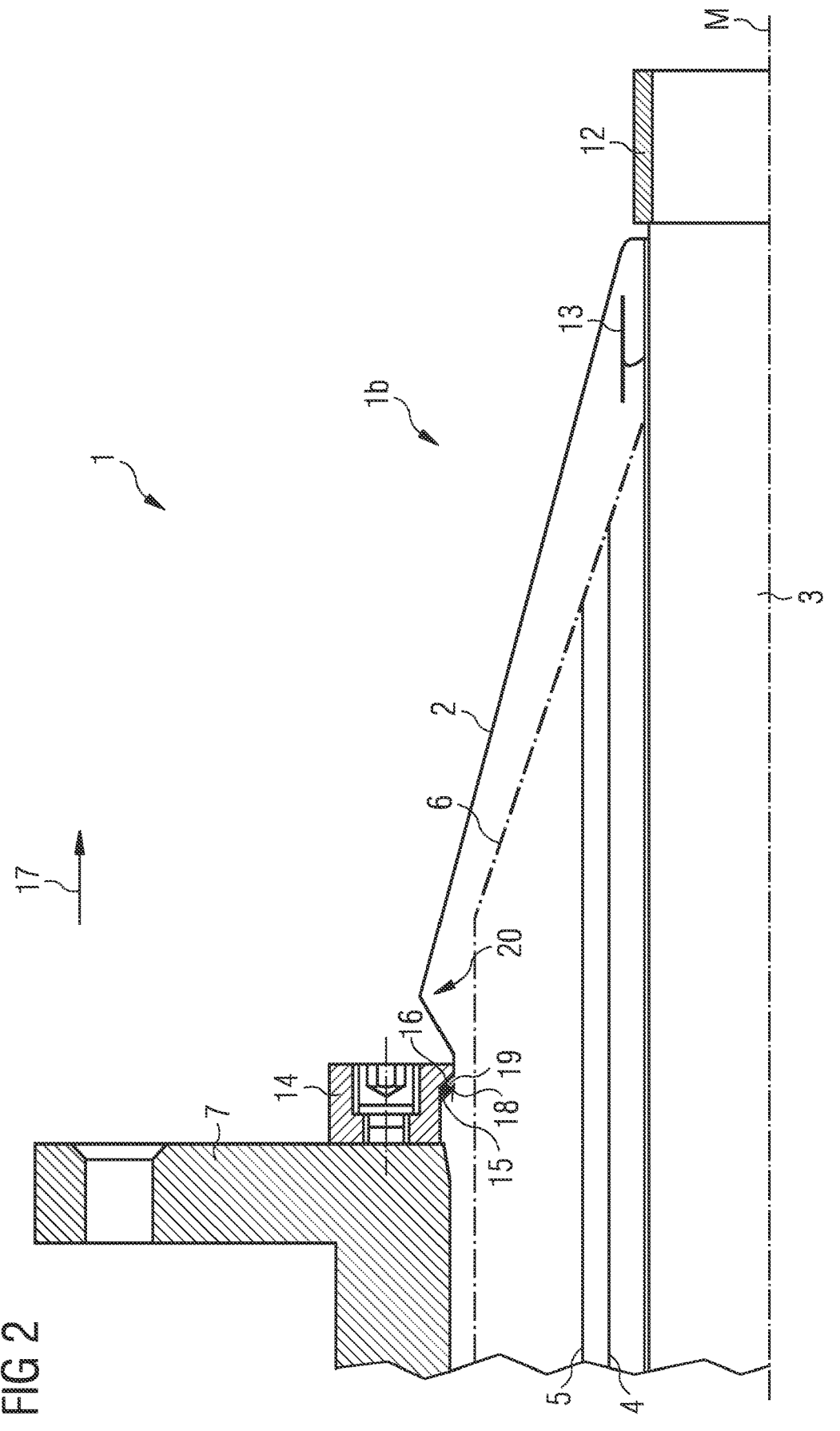
FIG. 2 shows a partial detail of the high-voltage bushing of FIG. 1 in a schematic representation.

Further details of the high-voltage bushing 1 will be explained hereinbelow in connection with FIG. 2. In FIGS. 1 and 2, the same elements and elements of the same type are provided with the same reference signs.

For improved adaptation to the cable connector, the high-voltage bushing 1 comprises at the cable end 1b a sleeve 12 for adaptation of an inner conductor diameter.

In order to improve the field control at the cable end 1b, the high-voltage bushing 1 has an electrode 13 which is connected to the inner conductor 3 (and thus is at the electrical level of the inner conductor) and which is arranged, in particular axially, outside an axial extent of the control region.

The high-voltage bushing 1 further comprises a retaining ring 14 which is connected to the fixing flange 7 by means of a screw connection. The retaining ring 14 is in two-part form and is joined together around the insulation member 2 on production of the high-voltage bushing 1. The insulation member 2 has on the outer circumference an outer projection 15 which cooperates by interlocking engagement with an inner projection 16 of the retaining ring 14. In this way, an axially acting force can be counteracted. According to one example, the fixing flange 7 can be arranged in a static manner, wherein a tensile force on a cable connected to the high-voltage bushing 1 acts in the direction indicated by an arrow 17 in order to counteract an axial force on the high-voltage bushing. The outer projection 15 cooperates with the inner projection 16 along an interlocking engagement surface 18 which is formed by the corresponding surfaces of the outer projection 15 that face the inner projection 16. The interlocking engagement surface 18 is inclined relative to a longitudinal axis of the high-voltage bushing by less than 90 degrees. In the example shown here, the interlocking engagement surface 18 does not lie directly against the inner projection 16, but instead an O-ring seal 19 is arranged between the inner projection 16 and the outer projection 15.

At the conically tapering cable end 1b of the high-voltage bushing 1, the insulation member has a counter-projection 20. The choice of the height of the counter-projection 20 allows the cone angle to be optimally adapted to a cable connector that is to be connected.

5

6

The invention claimed is:

1. A high-voltage bushing, comprising:

an insulation member;

an inner conductor passing through said insulation member;

a fixing flange arranged externally on said insulation member; and a retaining ring connected to said fixing flange, said retaining ring being formed with an inner projection;

said insulation member having an outer projection formed on an outer circumference thereof, said outer projection cooperating in an interlocking engagement with said inner projection of said retaining ring in order to counteract an axial force acting along a longitudinal axis of the high-voltage bushing; and said outer projection cooperating with said inner projection at an interlocking engagement surface, and said interlocking engagement surface being inclined relative to the longitudinal axis of the high-voltage bushing by less than 90 degrees.

2. The high-voltage bushing according to claim 1, wherein said retaining ring is in two-part form.

3. The high-voltage bushing according to claim 1, which comprises an O-ring seal disposed between said outer projection and said inner projection.

4. The high-voltage bushing according to claim 1, wherein said insulation member is formed with a counter-projection at a conically tapering end thereof.

5. The high-voltage bushing according to claim 1, which comprises a sleeve for adapting an inner conductor diameter.

6. The high-voltage bushing according to claim 1, wherein said insulation member comprises resin-impregnated insulation plies.

7. The high-voltage bushing according to claim 1, wherein said insulation member comprises a control region with conducting control inlays for electrical field control.

8. The high-voltage bushing according to claim 7, wherein said insulation member comprises an electrode which is electrically connected to said inner conductor and which is arranged outside an axial extent of said control region.

9. A cable termination box, comprising:

a high-voltage bushing according to claim 1;

said high-voltage bushing having a conductor end connected to an electrical conductor and a cable end connected to a cable connector.

10. The cable termination box according to claim 9, wherein said electrical conductor is a conductor of an overhead line.

* * * * *